(12) United States Patent
Dambrine et al.

(10) Patent No.: US 9,296,072 B2
(45) Date of Patent: Mar. 29, 2016

(54) METHOD FOR MANUFACTURING A METAL PART

(75) Inventors: Bruno Jacques Gérard Dambrine, Le Châtelet-en-Brie (FR); Thierry Godon, Sevran (FR); Alain Robert Yves Perroux, Ris Orangis (FR)

(73) Assignee: SNECMA, Paris (FR)

( * ) Notice: Subject to any disclaimer, the term of this patent is extended or adjusted under 35 U.S.C. 154(b) by 316 days.

(21) Appl. No.: 13/878,022

(22) PCT Filed: Oct. 5, 2011

(86) PCT No.: PCT/FR2011/052323
§ 371 (c)(1),
(2), (4) Date: Apr. 5, 2013

(87) PCT Pub. No.: WO2012/049401
PCT Pub. Date: Apr. 19, 2012

(65) Prior Publication Data
US 2013/0185938 A1   Jul. 25, 2013

(30) Foreign Application Priority Data

Oct. 5, 2010  (FR) ...................................... 10 58077

(51) Int. Cl.
*B23P 15/04*    (2006.01)
*B21D 53/78*    (2006.01)
(Continued)

(52) U.S. Cl.
CPC ............... *B23P 15/04* (2013.01); *B21D 39/031* (2013.01); *B21D 53/78* (2013.01); *B23K 20/021* (2013.01); *C21D 9/0068* (2013.01); *C22F 1/183* (2013.01); *F01D 5/147* (2013.01); *F04D 29/324* (2013.01);
(Continued)

(58) Field of Classification Search
CPC .................. Y10T 29/49936; Y10T 29/49937; Y10T 29/49339; Y10T 29/49341; Y10T 29/49343; B23P 15/04; F04D 29/324; F01D 5/147; B21D 53/78; B21D 26/059; B21D 35/007; B21D 39/031; F05D 2300/702; F05D 2240/303; F05D 2240/121; B29L 2031/082; B23K 2201/001; B23K 20/021; B23K 20/002; B23K 20/02; B21K 3/04; B29C 2037/0042; C21D 2241/61; C21D 2241/01

See application file for complete search history.

(56) References Cited

U.S. PATENT DOCUMENTS 2,263,220 A * 11/1941 Mejean ................... 310/216.011
2,863,633 A * 12/1958 Stalker ........................ 416/90 R
(Continued)

FOREIGN PATENT DOCUMENTS

EP   0 815 995 B1   6/2002
EP   1 574 207      9/2005
(Continued)

OTHER PUBLICATIONS

International Search Report as issued for PCT/FR2011/052323.

*Primary Examiner* — Jason L Vaughan
(74) *Attorney, Agent, or Firm* — Pillsbury Winthrop Shaw Pittman LLP

(57) ABSTRACT

A method for making a metallic part, includes positioning at least one metallic coil formed from flexible metal foil including a plurality of notches, on a shaping tool, the at least one coil being manually deformable when cold along three directions in space (X, Y, Z); hot isostatic pressing the at least one metallic coil in a tool causing compaction of the metallic coil so as to obtain the metallic part.

10 Claims, 3 Drawing Sheets

(51) Int. Cl.
*B23K 20/02* (2006.01)
*F01D 5/14* (2006.01)
*F04D 29/32* (2006.01)
*B21D 39/03* (2006.01)
*C21D 9/00* (2006.01)
*C22F 1/18* (2006.01)
*B29C 65/00* (2006.01)
*B29L 31/08* (2006.01)
*B29C 65/48* (2006.01)

(52) U.S. Cl.
CPC ........... *B23K 2201/001* (2013.01); *B29C 65/48* (2013.01); *B29C 65/483* (2013.01); *B29C 65/484* (2013.01); *B29C 66/12461* (2013.01); *B29C 66/12463* (2013.01); *B29C 66/301* (2013.01); *B29C 66/53* (2013.01); *B29C 66/721* (2013.01); *B29C 66/742* (2013.01); *B29L 2031/082* (2013.01); *C21D 2241/01* (2013.01); *F05D 2240/121* (2013.01); *F05D 2240/303* (2013.01); *F05D 2300/702* (2013.01); *Y02T 50/672* (2013.01); *Y02T 50/673* (2013.01); *Y10T 29/49337* (2015.01); *Y10T 29/49908* (2015.01)

(56) References Cited

U.S. PATENT DOCUMENTS

| | | | | |
|---|---|---|---|---|
| 3,584,972 | A | * | 6/1971 | Bratkovich et al. ........ 416/229 R |
| 3,720,441 | A | * | 3/1973 | Corchran .................. 297/230.12 |
| 4,472,866 | A | * | 9/1984 | Moracz et al. ................ 29/889.6 |
| 4,583,274 | A | * | 4/1986 | Moracz et al. .............. 29/889.71 |
| 4,597,916 | A | * | 7/1986 | Chen ............................... 261/94 |
| 4,604,247 | A | * | 8/1986 | Chen et al. ...................... 261/94 |
| 4,683,018 | A | * | 7/1987 | Sutcliffe et al. ................ 156/196 |
| 4,768,700 | A | * | 9/1988 | Chen .............................. 228/159 |
| 5,210,946 | A | * | 5/1993 | Monroe ...................... 29/889.71 |
| 5,375,978 | A | * | 12/1994 | Evans et al. .................... 416/230 |
| 7,640,661 | B2 | * | 1/2010 | Despreaux et al. .......... 29/889.7 |
| 8,840,750 | B2 | * | 9/2014 | Parkin ........................ 156/307.1 |
| 2004/0096350 | A1 | | 5/2004 | Moxson et al. |
| 2011/0211967 | A1 | * | 9/2011 | Deal et al. ..................... 416/224 |
| 2011/0274555 | A1 | * | 11/2011 | Iwasaki ...................... 416/241 R |
| 2012/0301292 | A1 | * | 11/2012 | Deal et al. ..................... 415/220 |

FOREIGN PATENT DOCUMENTS

| | | |
|---|---|---|
| EP | 1 908 919 B1 | 11/2009 |
| FR | 2 684 578 | 6/1993 |
| WO | WO 2009/039282 | 3/2009 |

* cited by examiner

METHOD FOR MANUFACTURING A METAL PART

CROSS-REFERENCE TO RELATED APPLICATIONS

This is the U.S. National Stage of PCT/FR2011/052323, filed Oct. 5, 2011, which in turn claims priority to French Patent Application No. 1058077, filed Oct. 5, 2010, the entire contents of all applications are incorporated herein by reference in their entireties.

This invention relates to a method for making a metallic part, for example such as a metallic reinforcement of a composite or metallic blade of a turbomachine.

The invention relates more particularly to a method of making a metallic reinforcement for the leading edge of a turbomachine blade.

The field of the invention is turbomachines, and more particularly fan turbomachine blades made of a composite material or metallic, the leading edge of which comprises a metallic structural stiffener.

However, the invention is also applicable to the manufacture of a metallic reinforcement to reinforce a leading edge or trailing edge of a blade of any type of turbomachine for use on land or for aeronautical use, and particularly a helicopter turbomotor or an aircraft turbojet, but also propellers such as double counter-rotating open rotor propellers.

Note that the leading edge corresponds to the forward part of an aerodynamic profile facing the airflow that divides the airflow into an intrados airflow and an extrados airflow. The trailing edge corresponds to the aft part of an aerodynamic profile at which the intrados and extrados flows come back together.

The turbomachine blades and particularly the fan blades are subject to high mechanical stresses related particularly to the rotation speed, and must satisfy strict weight and dimensional conditions. Consequently, lighter weight blades made of composite materials are used.

It is known that turbomachine fan blades made of composite materials can be fitted with a metallic structural reinforcement extending over the entire height of the blade and beyond their leading edge as disclosed in document EP1908919. Such a reinforcement can protect the composite blade at the time of impact of a foreign body such as a bird, hail or pebbles, on the fan.

In particular, the metallic structural reinforcement protects the leading edge of the composite blade by preventing any risks of delamination, failure of the fibre or damage by fibre/matrix separation.

Conventionally, a turbomachine blade comprises an aerodynamic surface extending along a first direction between a leading edge and a trailing edge and along a second direction approximately perpendicular to the first direction, between a root and a tip of the blade. The metallic structural reinforcement matches the shape of the leading edge of the aerodynamic surface of the blade and extends along the first direction beyond the leading edge of the aerodynamic surface of the blade to match the intrados and extrados profiles of the blade and along the second direction between the root and the tip of the blade.

In a known manner, the metallic structural reinforcement is a metallic part made entirely by milling from a block of material.

However, the metallic reinforcement of a leading edge of the blade is a complex part to be made requiring many reworking operations and complex tools resulting in high manufacturing costs.

In this context the invention is aimed at solving the problems mentioned above by disclosing a method of making a metallic reinforcement for the leading edge or the trailing edge of a turbomachine blade in order to simplify the manufacturing procedure for such a part while reducing manufacturing costs.

To achieve this, the invention discloses a method of making a metallic part comprising the following steps in sequence:
  a step to position at least one metallic coil formed from flexible metal foil comprising a plurality of notches, on a shaping tool, said at least one coil being manually deformable when cold along three directions in space;
  a hot isostatic pressing step of said at least one metallic coil in a tool causing compaction of said metallic coil so as to obtain said metallic part.

Thanks to the invention, the complex shaped metallic part, for example such as a metallic structural reinforcement comprising two curvatures along two different planes (or twisting about an axis), is made simply and quickly from at least one flexible metallic coil deformable along three dimensions, obtained by simple cutting operations of sheets or metal foil, and a hot isostatic pressing (HIP) or compacting method to obtain a compact part without any pores through a combination of plastic deformation, creep and diffusion bonding.

The metallic coils are formed by forming cut outs on thin metallic foil, the geometry of which approximately corresponds to the developed geometry of the metallic part to be made. The metallic coils thus made are easily deformable and easily positionable on a shaping template such as a dummy or directly on the punch of the shaping tool.

This manufacturing method thus eliminates the need for complex production of the blade reinforcement by machining from a solid part by milling or broaching, from flats requiring the use of a large volume of material and consequently high raw material procurement costs. The method can also be used to easily make metallic reinforcement that respect strict mass and/or geometry requirements.

The manufacturing method according to the invention may also have one or several of the following characteristics, considered individually or with all technically possible combinations:
  a step to cut out a plurality of notches in at least one piece of flexible metal foil so as to form staggered openings distributed on each side of the longitudinal edges of the metallic foil in order to form at least one metallic coil;
  said at least one metallic coil is formed by the assembly of two pieces of metallic foil cut out during said step to cut out a plurality of notches;
  before said positioning step, said method comprises a step to manufacture at least one metallic pouch from at least one piece of flexible metallic foil, said at least one metallic coil being formed in a step to cut out a plurality of notches in said at least one flexible metallic pouch;
  said step to cut out notches is made by cutting out a plurality of notches on each side of the longitudinal edges of said at least one metallic foil and/or distributed along the length of said metallic foil at a given cut pitch;
  before said step to cut out a plurality of notches, said method comprises a step to cut out at least one piece of flexible metallic foil from at least one metallic sheet with a thickness of less than 0.3 mm;
  before said isostatic pressing step, said method comprises a step to stack at least one second metallic coil on said first metallic coil placed on said shaping tool;
  two metallic coils stacked in sequence during said stacking step have cut pitches offset from each other;

said metallic part is a metallic reinforcement of a leading or trailing edge of a turbomachine blade or a metallic reinforcement of a propeller;

said shaping tool is a shaping template or the punch of an isostatic pressing tool or the die of said isostatic pressing tool.

Other characteristics and advantages of the invention will become clearer after reading the following description given for information and that is in no way limitative, with reference to the appended figures among which:

Common elements have the same reference numbers in all figures, unless mentioned otherwise.

In the remainder of the description, the metallic reinforcement of the leading or trailing edge will be referred to indifferently as the reinforcement or metallic reinforcement.

Figure 1:
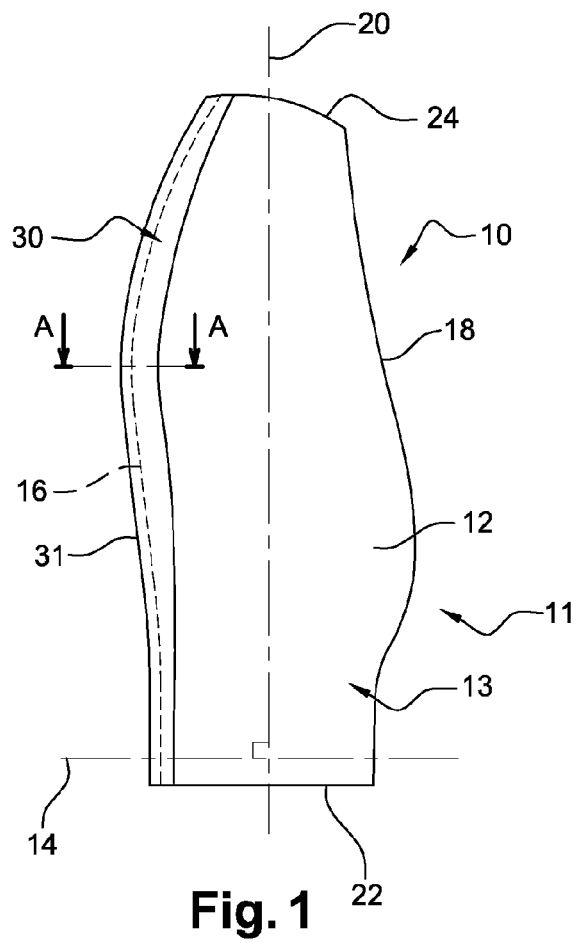
FIG. 1 is a side view of a blade comprising a hollow metallic structural reinforcement of a leading edge obtained using the method according to the invention.

FIG. 1 is a side view of a blade comprising a metallic structural reinforcement of a leading edge obtained using the manufacturing method according to the invention.

The blade 10 shown may for example be a mobile blade of a turbomachine fan (not shown).

The blade 10 comprises an aerodynamic surface 12 extending along a first axial direction 14 between a leading edge 16 and a trailing edge 18 and along a second radial direction 20 approximately perpendicular to the first direction 14 between a root 22 and a tip 24.

The aerodynamic surface 12 forms the extrados face 13 and the intrados face 11 of the blade 10, only the extrados face 13 of the blade 10 is shown in FIG. 1. The intrados 11 and the extrados 13 form the side faces of the blade 10 that connect the leading edge 16 to the trailing edge 18 of the blade 10.

In this embodiment, the blade 10 is a composite blade typically obtained by layup or by shaping a woven fibrous texture. For example, the composite material used may be made from a woven carbon fibre and resin matrix assembly, the assembly being formed by moulding using an RTM (Resin Transfer Moulding) type resin injection method.

The blade 10 comprises a metallic structural reinforcement 30 glued at its leading edge 16 and that extends along the first direction 14 beyond the leading edge 16 of the aerodynamic surface 12 of the blade 10 and along the second direction 20 between the root 22 and the tip 24 of the blade.

Figure 2:
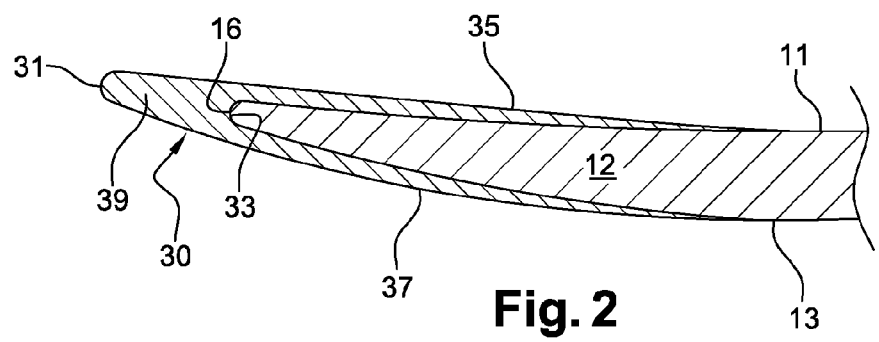
FIG. 2 is a partial sectional view of FIG. 1 along a section plane AA.

As shown in FIG. 2, the structural reinforcement 30 matches the shape of the leading edge 16 of the aerodynamic surface 12 of the blade 10 that it extends to form a leading edge 31, called the leading edge of the reinforcement.

Conventionally, the structural reinforcement 30 is a single-piece part comprising an approximately V-shaped section with a base 39 forming the leading edge 31 and extended by two side flanks 35 and 37 matching the intrados 11 and extrados 13 respectively of the aerodynamic surface 12 of the blade. The flanks 35, 37 have a tapered or thinned profile towards the trailing edge of the blade.

The base 39 of the structural reinforcement 30 also comprises an internal cavity 40 extending along the height of the structural reinforcement 30, from the root to the tip of the blade.

The structural reinforcement 30 is a metallic and preferably titanium-based reinforcement. Titanium has a high capacity to absorb energy due to shocks. The reinforcement is glued onto the blade 10 using glue known to those skilled in the art, for example such as a cyanoacrylate glue or epoxy glue.

This type of metallic structural reinforcement 30 used for stiffening the composite blade of the turbomachine is disclosed particularly in patent application EP1908919.

The method according to the invention can be used to make a structural reinforcement as shown in FIG. 2 that shows the reinforcement 30 in its final state.

Figure 3:
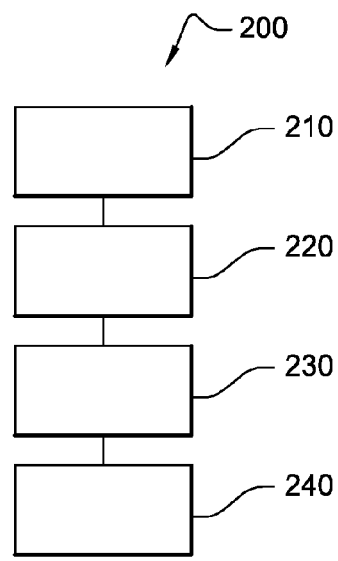
FIG. 3 is a block diagram showing the main steps in manufacturing a metallic structural reinforcement for a leading edge of a turbomachine blade according to the manufacturing method disclosed in the invention.

FIG. 3 is a block diagram showing the main steps in a method 200 of making a metallic structural reinforcement 30 for the leading edge of a blade 10 as shown in FIGS. 1 and 2.

The first step 210 of the manufacturing method 200 is a step in which a plurality of flexible metallic parts 101 are cut to form metallic foil, from a metallic sheet or a thin flexible titanium-based metallic strip.

Figure 4:
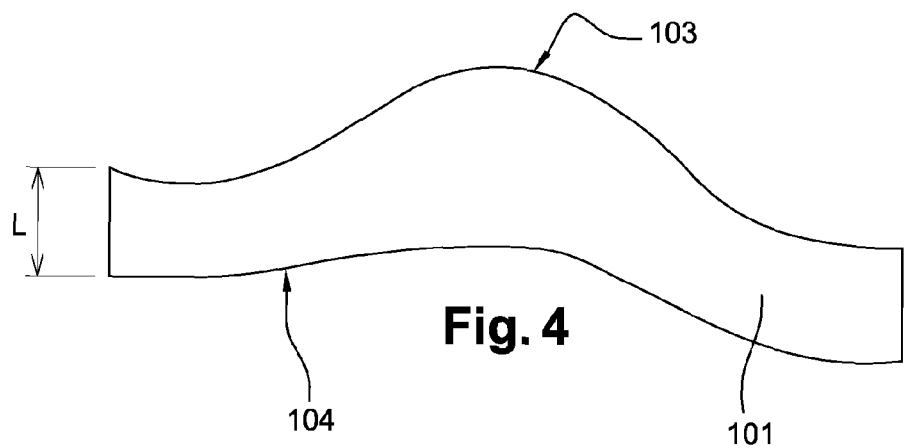
FIG. 4 shows a side view of the metallic reinforcement of the leading edge of a turbomachine blade during the first step in the method shown in FIG. 3.

The metallic foil 101 as shown in FIG. 4 is cut out by conventional means for cutting thin metallic sheets, in other words sheets with a thickness of less than 0.3 mm. Thus, the metallic foil 101 may for example be cut by punch cutting means, shear cutting means or a water jet, etc.

The cut out metallic foil 101 has a geometry that corresponds approximately to the developed shape of a face of the metallic reinforcement 30 of a leading edge of a blade 10, as shown in FIGS. 1 and 2.

The second step 220 of the manufacturing method 200 is a step to cut out a plurality of notches 110 in each metal foil 101.

The notches 110 are advantageously made so as to obtain staggered openings distributed on each side of longitudinal edges 103, 104 of the metallic foil 101.

The pitches of the notches 110 along the longitudinal direction of the foil 101 and the shape of the notches 110 are adapted to satisfy the needs of the metallic part to be made.

Figure 5:
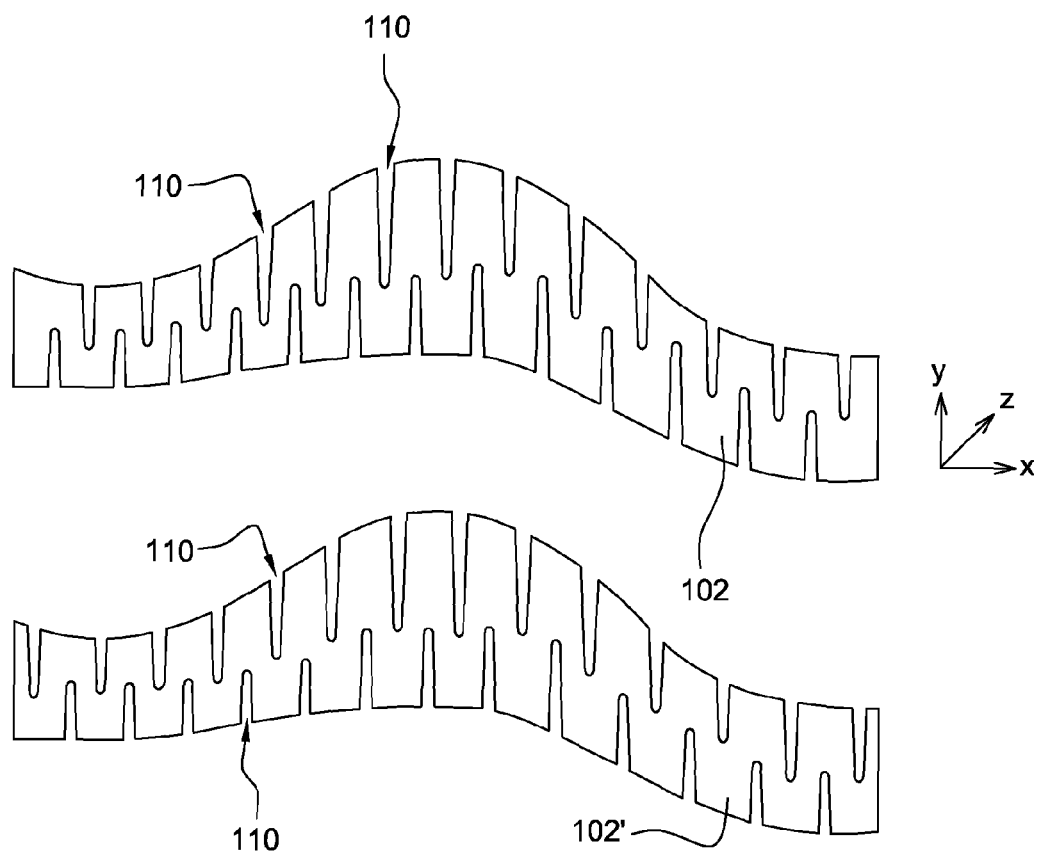
FIG. 5 shows a side view of the metallic reinforcement of the leading edge of a turbomachine blade during the second step in the method shown in FIG. 3.

The metallic foil 101 comprising a plurality of notches distributed staggered along its length thus forms a flexible metallic "coil" 102, 102' shown in FIG. 5. The metallic coil 102, 102' thus obtained can easily be deformed along the three dimensions X, Y, and Z and can match all geometries.

According to another embodiment of the invention, the first cutting step and the second cutting step may be done simultaneously in the same tool, either in two operations or in a single cutting operation.

The third step 230 is a positioning step of one or several metallic coils 102, 102'.

According to a first embodiment, the positioning step 230 is done by positioning one or several metallic coils on a shaping template (not shown) representing the negative impression of the part to be made. In our example embodiment, the shaping template has the same geometry as the leading edge of the turbomachine blade.

The metallic coils 102, 102' are put into place by overlapping the metallic coil on the shaping template at each notch 110.

The plurality of notches distributed along the length of the foil allows the metallic coil to match any complex shaping template shape.

Advantageously, the positioning step may also be a step to stack a plurality of metallic coils 102, 102'.

To achieve this, the metallic coils 102, 102' are advantageously made in two distinct categories that have different but complementary cutting pitches. In other words, the two categories of metallic coils are made with an offset of the cutting pitch such that material missing due to the notches 110 in the lower metallic coil can be covered when stacking the metallic coils of each category.

Advantageously, the different layers of metallic coils 102, 102' may be held in place by gluing or by welding means.

Two layers of metallic coils 102, 102' made of titanium may be glued simply by heating two superposed metallic coils under a slightly pressurised atmosphere.

The weld is made by known welding means in order to weld two thin metallic titanium sheets. Thus for example, the metallic coils 102, 102' are assembled by spot welds, by an electrical discharge welding method or by any other method of fixing the two thin titanium sheets together.

Figure 6:
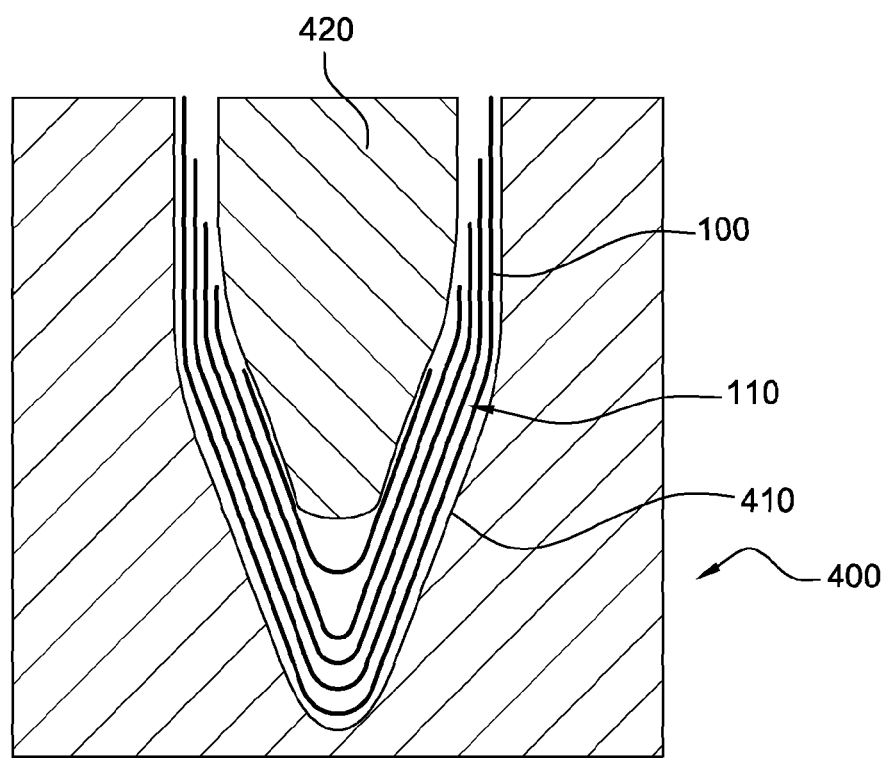
FIG. 6 shows a side view of the metallic reinforcement of the leading edge of a turbomachine blade during the third step in the method shown in FIG. 3.

In this first embodiment of the invention, an additional operation is necessary to put the stack of metallic coils 102, 102' into position in a shaping tool 400 shown diagrammatically in FIG. 6. The tool 400 comprises a die 410 corresponding to the final external shape of the metallic reinforcement 30 and a punch 420 corresponding to the final internal shape of the metallic reinforcement of the leading edge.

According to a second embodiment, the positioning step 230 is made directly on the punch 420 of the shaping tool 400 as shown in FIG. 6.

According to a third embodiment of the invention, the positioning step 230 is done directly in the die 410 of the tool by successive positioning of the different metallic coils.

Advantageously, the metallic coils 102, 102' are made from foil 101 with different widths L such that the stack formed by the different layers of the metallic coils 102, 102', respects the material thickness requirements necessary to make the final part (i.e. the metallic reinforcement 30).

It could also be envisaged to optimise the stack thicknesses by making flexible metallic coils with different thickness, in other words thicknesses varying approximately from 0.05 to 0.3 mm.

According to another embodiment, the method according to the invention may comprise an additional step to make metallic pouches from one or several pieces of metallic foil 101 cut out during the first cutting step 210.

Thus, during this manufacturing step, a metallic pouch may be made from a single piece of metallic foil folded in a V-shape that is then cut approximately to the geometry of the part to be made.

A metallic pouch may also be made by superposing a first foil 101 corresponding to the geometry of the intrados face of the metallic reinforcement 30 with a second foil 101 corresponding to the geometry of the extrados face of the metallic reinforcement 30. The two pieces of foil 101 are then assembled at at least a common edge approximately corresponding to the profile of the leading edge 31 of the reinforcement 30, for example by gluing or by welding means so as to form a metallic pouch.

The two pieces of metallic foil 101 made of titanium may be glued simply by heating the two pieces of metallic foil 101 superposed together under a slightly pressurised atmosphere.

The weld at the common edge is made by known welding means to weld two thin titanium metallic sheets. Thus for example, the two pieces of foil 101 are assembled by spot welds or by an electric welding method.

Therefore the second cutting step 220 in the manufacturing method 200 can be used to make a plurality of notches on the metallic pouches thus made to obtain V-shaped metallic coils.

The notches 110 are advantageously made so as to obtain staggered openings on each side of the longitudinal edges of the metallic pouches.

According to another embodiment of the method according to the invention, this step to make metallic pouches can take place after the second step 220 during which a plurality of notches are cut out on the metallic foil pieces.

In this embodiment, the V-shaped metallic coils are made from a single folded metallic coil or from two metallic coils 102, 102', as shown in FIG. 5, assembled by gluing or by welding means as described above, at the common edges.

In the various embodiments used to make V-shaped metallic coils, the positioning step 230 is performed by positioning one or several metallic V-shaped coils directly on the punch 420 of the shaping tool 400 or in the die 410 of the shaping tool 400.

The metallic V-shaped coils are preferably placed on the edge of the punch 420 (forming the leading edge of the blade) so as to facilitate the positioning operation of the different metallic coils.

According to another embodiment, an insert may be inserted between two successive metallic coils 102, 102', for example so as to form a more consequent material thickness, a specific reinforcement made of a different material or to make a hollow metallic reinforcement.

For example, the insert may be a solid insert made by a forging, machining or casting process, or an insert woven from metallic thread could also be used, for example using titanium thread and/or silicon carbide and titanium-based thread (SiC—Ti), and/or boron coated thread (SiC-Bore), or silicon carbide coated thread (SiC—SiC).

Regardless of the nature of the material used to manufacture the insert placed between the coils, this material must be compatible with the nature of the material used for making the metallic coils and have properties that enable superplastic forming and diffusion bonding.

In making a hollow metallic reinforcement (not shown), the insert is a temporary insert made from a material different from the material used for the metallic foil 101.

A "temporary insert" is an insert that is not intended to be permanent and that is necessary only to make the hollow metallic reinforcement of the leading edge. Therefore, the temporary insert is not present in the metallic reinforcement in its final state and does not in any way participate in the mechanical properties of the metallic reinforcement.

For example, the temporary insert may be made from a material capable of resisting a high temperature of the order of 900° C., high pressure of the order of 1000 bars, and that is compatible with the materials from which the metallic foil 101 is made so as not to create any impurities or oxidation in the preform 110.

It must also be possible to chemically attack the material from which the temporary insert is made by dissolution using a chemical. Advantageously, the temporary insert may be made of copper, quartz or silica.

The shape of the temporary insert incorporated into the stack of metallic foil 101 depends on the shape of the required final internal cavity.

Figure 7:
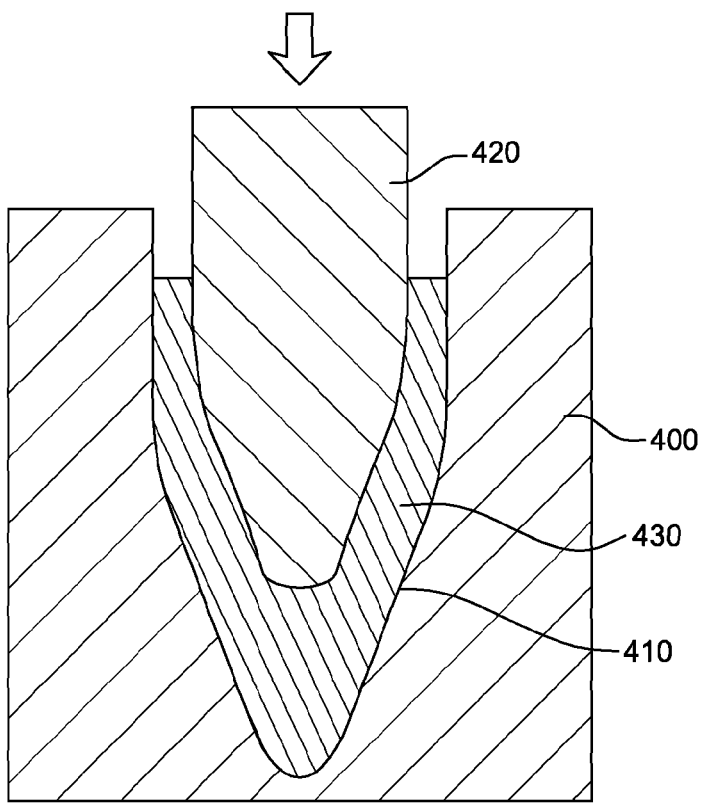
FIG. 7 shows a side view of the metallic reinforcement of the leading edge of a turbomachine blade during the fourth step in the method shown in FIG. 3.

The fourth step 240 in the manufacturing method 200 is a hot isostatic pressing (HIP) step of the stack formed in the tool 400, shown in FIG. 7.

Hot isostatic pressing is a frequently used manufacturing method well known for reducing the porosity of metals and for its influence on the density of many metals such as ceramics. The hot isostatic pressing method can also improve the mechanical properties and usability of materials.

Isostatic pressing is done at a high temperature (conventionally between 400° C. and 1400° C., of the order of 1000° C. for titanium) and at isostatic pressure.

Thus, application of heat combined with internal pressure eliminates voids in the stack and microporosities by means of a combination of plastic deformation, creep and diffusion bonding so as to form a solid part 430.

The solid part 430 resulting from the isostatic pressing step comprises the internal and external profiles of the metallic reinforcement 30. The solid part 430 is then stripped from the tool 400.

The isostatic pressing step is done under a vacuum, advantageously under a secondary vacuum, either in a welded tool in which the secondary vacuum is created, or inside a bag in the autoclave, the choice of the method depending on the number of parts to be produced. The secondary vacuum can avoid the presence of oxygen in the tool and in the fibrous structure during the titanium isostatic pressing step.

The tool 400 is made from a mechanical alloy called super alloy or high performance alloy.

The isostatic pressing step 240 may include a preliminary cleaning, degreasing step and/or a chemical attack step on the different metallic coils 102, 102' so as to eliminate residual impurities in the stack.

Advantageously, the impurity cleaning step is done by dipping the fibrous assembly into a bath of a cleaning agent or chemical.

When manufacturing a hollow metallic reinforcement, the method according to the invention may comprise an additional step for chemical attack of the insert inserted during the stacking step of the different pouches, and forming an integral part of the solid part 430. The chemical attack is made using a chemical agent capable of attacking the material from which the insert is made. The chemical attack of the temporary insert dissolves the temporary insert such that the space released by the dissolved insert forms the internal cavity in the metallic reinforcement. Advantageously, the chemical attack step is made by dipping the solid part 430 into a bath containing the chemical agent suitable for dissolving the insert. For example, the chemical agent may be an acid or a base.

Advantageously, the chemical agent is capable of dissolving copper, quartz or silica.

In combination with these main manufacturing steps, the method according to the invention may also comprise a finishing and reworking step by machining the hollowed out solid part obtained at the exit from the tool so as to obtain the reinforcement 30. This reworking step comprises:
- a reworking step of the basic profile 39 of the reinforcement 30 so as to taper it, particularly the aerodynamic profile of the leading edge 31;
- a reworking step of the flanks 35, 37; this step consists particularly of trimming the flanks 35, 37 and thinning the intrados and extrados sides;
- a finishing step in order to obtain the required surface condition.

The method according to the invention may also comprise non-destructive testing steps of the reinforcement 30 in association with these main manufacturing steps, to assure the geometric and metallurgical conformity of the assembly obtained. For example the non-destructive tests may be done using an X-ray process.

The invention has been described particularly for the manufacture of a metallic reinforcement for a composite turbomachine blade; however, the invention is equally applicable for manufacturing a metallic reinforcement for a metallic turbomachine blade.

The invention has been described particularly for the manufacture of a metallic reinforcement for a leading edge of a turbomachine blade; however, the invention is also applicable for manufacturing a metallic reinforcement for a trailing edge of a turbomachine blade or for manufacturing a metallic reinforcement for a composite or metallic propeller.

The other main advantages of the invention are:
reduction of manufacturing costs;
reduction of manufacturing time;
simplification of the manufacturing procedure;
reduction of material costs.

The invention claimed is:

1. A method for making a metallic part comprising:
positioning at least one metallic coil formed from flexible metal foil comprising a plurality of notches, on a shaping tool, said at least one coil being manually deformable when cold along three directions in space, and
hot isostatic pressing said at least one metallic coil in a tool causing compaction of said metallic coil so as to obtain said metallic part,
wherein before said positioning, said method comprises cutting out a plurality of notches in at least one flexible metallic foil so as to form said at least one metallic coil.

2. The method for making a metallic part according to claim 1, wherein said at least one metallic coil is formed by the assembly of two pieces of metallic foil cut out during said cutting out of a plurality of notches.

3. The method for making a metallic part according to claim 1, wherein before said positioning, said method comprises making at least one metallic pouch from the at least one flexible metallic foil, said at least one metallic coil being formed from cutting out a plurality of notches in said at least one flexible metallic pouch.

4. The method for making a metallic part according to claim 1, wherein said cutting out is performed by cutting a plurality of notches on each side of the longitudinal edges of said at least one metallic foil or distributed along the length of said metallic foil at a given cut pitch, or both on each side of the longitudinal edges of said at least one metallic foil and distributed along the length of said metallic foil at a given cut pitch.

5. The method for making a metallic part according to claim 1, wherein before said cutting out, said method comprises cutting out the at least one piece of flexible metallic foil from at least one metallic sheet with a thickness of less than 0.3 mm.

6. The method for making a metallic part according to claim 1, wherein before said isostatic pressing, said method comprises stacking at least one second metallic coil on said first metallic coil placed on said shaping tool.

7. The method for making a metallic part according to claim 6, wherein two metallic coils stacked in sequence during said stacking have cut pitches offset from each other.

8. The method for making a metallic part according to claim 1, wherein said metallic part is a metallic reinforcement of a leading or trailing edge of a turbomachine blade or a metallic reinforcement of a propeller.

9. The method for making a metallic part according to claim 1, wherein said shaping tool is a shaping template or the punch of an isostatic pressing tool or the die of said isostatic pressing tool.

10. The method for making a metallic part according to claim 1, further comprising positioning the metallic part on a leading edge or a trailing edge of a blade.

* * * * *